FIG. I

INVENTOR.
MASASHI MOROOKA

Feb. 14, 1967  MASASHI MOROOKA  3,303,994
EXHAUST GAS TURBINE SUPERCHARGER
Filed March 5, 1965  5 Sheets-Sheet 3

INVENTOR.
MASASHI MOROOKA
BY McGlew and Toren
ATTORNEYS 3,303,994
EXHAUST GAS TURBINE SUPERCHARGER
Masashi Morooka, Nagasaki-shi, Japan, assignor to Mitsubishi Jukogyo Kabushiki Kaisha, Tokyo, Japan
Filed Mar. 5, 1965, Ser. No. 437,435
Claim priority, application Japan, Mar. 16, 1964, 39/14,513
15 Claims. (Cl. 230—116)

This invention relates to exhaust gas turbine superchargers and, more particularly, to an exhaust gas turbine supercharger, or turbo-supercharger, having an improved bearing arrangement providing for ready access to, inspection and repair of the bearings.

Exhaust gas turbine superchargers include an exhaust gas turbine and a rotary compressor, with the turbine rotor and the compressor rotor both mounted upon a common shaft rotatably supported in bearings. As hitherto constructed, the shafts of such superchargers have been supported in antifriction bearings, circular or cylindrical sliding bearings, or duplex type sliding bearings interposed between the turbine and the supercharger or compressor. When antifriction bearings, such as roller bearings, have been used, or when circular sliding bearings have been used, inspection or repair of the turbine bearings was impossible without first removing the turbine rotor or the compressor rotor, due to the completely circular and continuous form of the bearings.

When duplex-type sliding bearings have been used, they have generally been combined in one piece with a completely circular support. This also has involved difficulties in inspection of repair of the bearings. In particular, in order to permit such inspection or repair, the rotor shaft has had to be completely removed from the housing in order to disengage the circular support for the bearings. As a consequence, it has been necessary to use bearings having substantially the same diameter as the rotor shaft, and thus a so-called "stepped" rotor shaft, which is preferred, could not be used. As an exhaust gas turbo supercharger usually requires a relatively large diameter rotor shaft, it has been necessary to use large diameter bearings. This not only results in increased friction at the bearings, but also has other accompanying disadvantages.

In the usual exhaust gas turbine superchargers, it has been customary to employ a turbine casing and an intermediate casing, which latter mounts the bearings for the rotor shaft, and these two casings being integrally combined into one unit. Consequently, means has had to be provided to cool the bearings to avoid excessive temperature rise due to the high temperature exhaust gases used to drive the turbine. Among the cooling expedients used for this purpose has been that of cooling the turbine casing or the intermediate casing, using oil to cool the bearings and the bearing support parts of the intermediate casing or its adjacent parts, utilizing heat radiating plates, etc.

These cooling methods have had some inherent disadvantages. For example, the concentration of sulphuric compounds in the exhaust gas are converted into sulphuric acid within the turbine casing. This results in corrosion of the interior of the casing. When water cooling, particularly of the intermediate casing, or oil cooling of the bearing and adjacent support parts, are used, heat distortion of the casing has frequently been caused, resulting in deformation or damage of the equipment. The use of heat radiating plates has resulted in the waste of a large proportion of the heat input by dissipation, and this has very substantially lowered the operating efficiency.

An object of the present invention is to provide an exhaust gas turbine supercharger having a construction in which the aforementioned difficulties are avoided.

Another object of the invention is to provide an exhaust gas turbine supercharger in which the turbine casing and the compressor casing are interconnected by an independent intermediate frame formed with openings providing access to a bearing stand supporting the rotor shaft.

A further object of the invention is to provide an exhaust gas turbine supercharger in which the turbine casing and the compressor casing are interconnected by an intermediate frame having openings providing access to a bearing stand which supports the rotor shaft, this bearing stand being provided with a bearing cover which is accessible, for removal, through the openings in the intermediate frame.

Yet another object of the invention is to provide an exhaust gas turbine construction in which the turbine casing and the compressor casing are interconnected by an intermediate frame provided with openings for access to a bearing stand supporting the rotor shaft, this bearing stand being provided with a disengageable bearing cover which encloses half-bearings, or semi-cylindrical bearings, one half of each bearing being supported on the bearing stand and the complementary half of the bearing being nested in the disengageable cover, the openings in the intermediate frame providing for access to the cover and removal thereof for inspection, removal and/or repair of the bearings.

A further object of the invention is to provide an exhaust gas turbine supercharger in which the bearings for the shaft may be inspected, removed, and/or replaced without removing a center frame interconnecting the turbine casing and the compressor casing.

Still another object of the invention is to provide an exhaust gas turbine supercharger including a stepped shaft mounting the rotors of the turbine and the compressor, and in which the stepped shaft need not be removed, nor need the rotors be removed, for inspection, replacement and/or repair of the bearings for the shaft.

Another object of the invention is to provide an exhaust gas turbine supercharger in which the shaft mounting the turbine rotor and the compressor rotor is supported in bearings which have a diameter substantially smaller than the diameter of the largest diameter section of the shaft.

For an understanding of the principles of the invention, reference is made to the following description of typical embodiments thereof as illustrated in the accompanying drawings.

Figure 1:
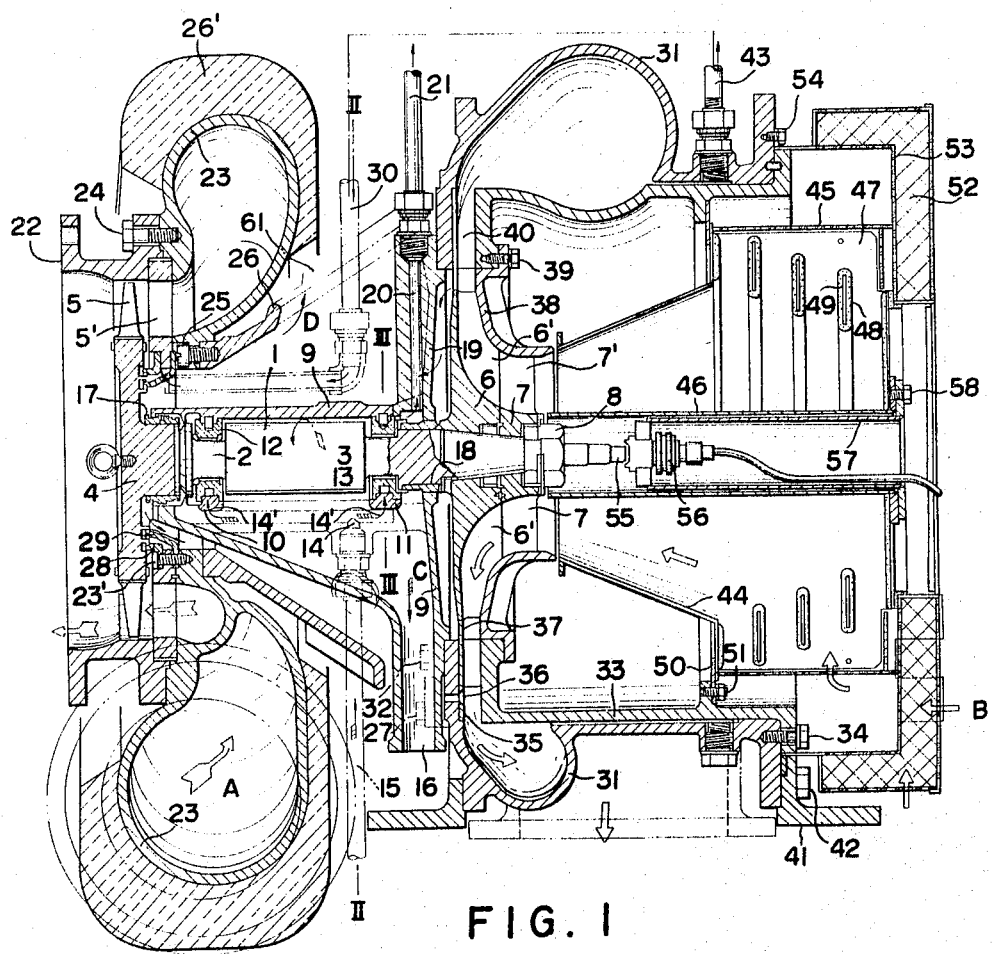
FIG. 1 is a longitudinal or axial sectional view through one form of exhaust gas turbine supercharger embodying the invention.
Figure 2:
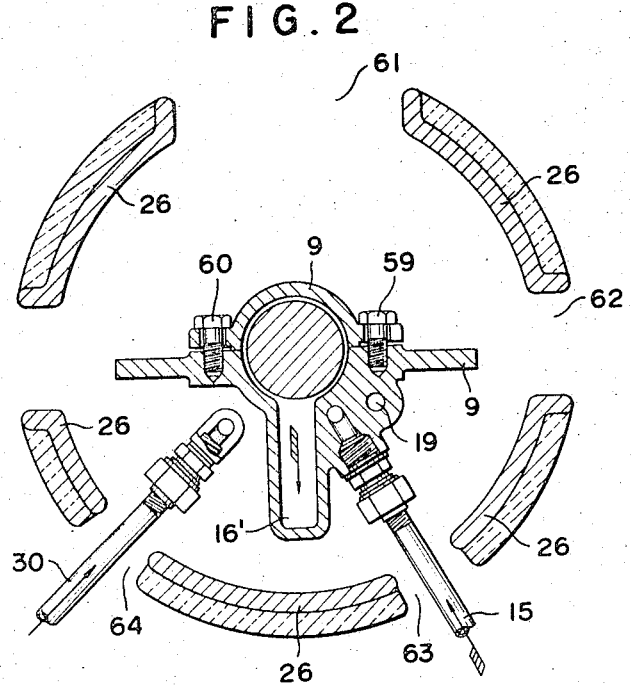
FIG. 2 is a sectional view taken on the line II—II of FIG. 1.
Figure 3:
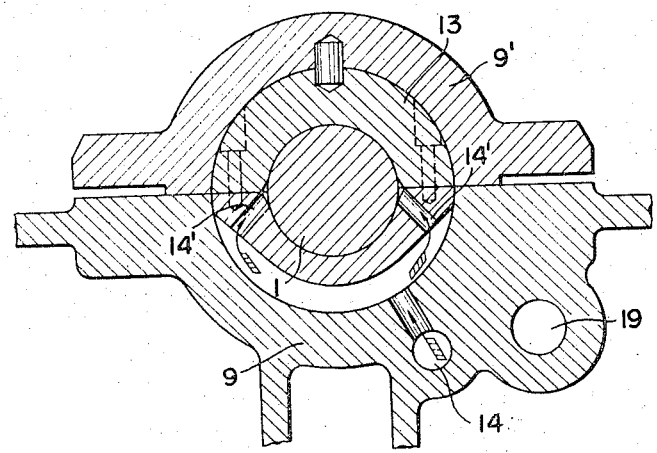
FIG. 3 is an enlarged cross sectional view of a portion of FIG. 2, taken on the line III—III of FIG. 1.

Referring first to the embodiment of the invention shown in FIGS. 1, 2 and 3, a rotor shaft 1 is illustrated as having relatively small diameter bearing portions 2 and 3 which are axially separated by a relatively large diameter and axially elongated portion of shaft 1. A turbine rotor or disk 4 is formed integrally with shaft 1, at one end of the latter, and rotor 4 has turbine blades or vanes 5 positioned in operative relation with turbine stationary nozzles or vanes 5'. A compressor rotor 6 is secured on the opposite end of shaft 1, and has blades or vanes 6'. Outwardly of rotor 6, and in firm engagement therewith, a second or intake rotor 7 is secured to shaft 1 and is provided with blades or vanes 7'. A nut assembly 8 may be used to secure rotors 6 and 7 firmly on a tapered end portion of shaft 1, as illustrated.

Shaft 1 is rotatably supported in a bearing stand 9 provided with a removable bearing cover 9', which latter is substantially semicylindrical in cross section and extends over the bearing portions 10 and 11 of stand 9. Each of these bearing portions 10 and 11 supports one half of a two semicylindrical section bearing 12 and 13, respectively. Each bearing 12 and 13 comprises two complementary semicylindrical sections which rotatably support the shaft 1 at the bearing portions 2 and 3 thereof, respectively.

As best seen in FIGS. 1 and 3, the lower half of each bearing is formed with lubricant feed passages 14' which are supplied through a lubricant passage 14 connected to a lubricant feed pipe 15. The lubricant is discharged through a lubricant outlet 16 formed in stand 9. Labyrinth packings 17 and 18 are provided outwardly of bearings 12 and 13, respectively, to avoid any lubricant leakage from shaft supporting sections 10 and 11 of stand 9. In addition, the labyrinth packings 17 and 18 are kept under positive air pressure by air under pressure supplied through an air line 19, the air being discharged through a passage 20 connected to an air discharge line 21.

The turbine casing is indicated at 22, and this casing, together with an exhaust gas supply pipe 23, is connected to one end of an intermediate frame 26 by means of bolts 24 and 25, the bolts 24 connecting exhaust gas supply pipe 23 to turbine casing 22, and bolts 25 connecting exhaust gas supply pipe 23 to frame 26. The nozzles or guide vanes 5' are formed in a ring which is connected to exhaust gas supply pipe 23 by means of bolts 23'. Supply pipe 23 is preferably covered with heat insulating material, as indicated at 26'. Intermediate frame 26 and bearing stand 9 are separate units, that is, they are not formed as one unit or integral with each other.

The compressor includes an outer casing 31 and an inner casing 33. Outer casing 31 is secured to the adjacent end of intermediate frame 26 by means of bolts 27. Labyrinth packings 28 and 29 are provided, adjacent turbine rotor 4, to prevent any leakage of exhaust gas around rotor 1. To further prevent any such leakage of exhaust gas, air under pressure is supplied around rotor 1 by means of an air supply pipe 30 which delivers high pressure sealing air. Bearing stand 9 is mounted on outer compressor casing 31 by means of bolts 32, and inner compressor chamber 33 is mounted on outer chamber 31 by means of bolts 34, as best seen toward the right end of FIG. 1.

A separator or dividing plate 35 is secured within outer casing 31 by means of screw 36, and is formed in such a manner as to provide air feed holes 37. An air intake section 38 is mounted on inner compressor chamber 33 by means of bolts 39, and guide vanes are positioned between inner chamber 33 and dividing or separator plate 35. The mounting for the supercharger is indicated at 41, and outer chamber 31 is secured to mounting 41 by means of bolts 42. A high pressure air feed pipe 43, as best seen toward the upper right end of FIG. 1, is in communication with the space or volume defined by outer compressor casing 31 and inner compressor casing 33, and pipe 43 delivers high pressure air to air feed pipe 30, as schematically illustrated.

The air intake for the compressor includes a frusto-conical section 44, a cylindrical section 45 which is perforated, and a substantially cylindrical tube 46 coaxial with shaft 1. Tube 46 is provided with radially and axially extending ribs 47 formed with apertures 48 mounting annular plates 49 covered with sound absorbing material. A mounting flange 50 of intake section 44 is secured to inner compressor chamber 33 by means of bolts 51. A filter 52 is secured to the outer compressor chamber 31 by means of bolts 54, and includes filter material covered by perforated plates 53.

A tachometer magnet 55 is secured to the intake end of the compressor, as by being mounted on an end of shaft 1, and has associated therewith a pick-up 56. The pick-up is supported concentrically of rotor shaft 1 by a tubular support member 57 telescoped within cylindrical tube 46. Tubes 46 and 57 are secured together by means of bolts 58 interconnecting juxtaposed flanges of these tubes.

Referring more particularly to FIG. 2, bearing cover 9' is disengageably secured to bearing stand 9 by bolts 59 and 60. Intermediate frame 26 is formed with openings 61 through 65 which provide an adequate flow of cooling air through and around the intermediate frame. Lubricant feed pipe 15 extends through one of these openings, namely the opening 63, and air feed pipe 30 extends through the opening 64.

The operation of the exhaust gas turbine is conventional. The exhaust gas is injected into the supply pipe 23 and flows, as indicated by the arrow A, around the supply pipe and through the fixed vanes 5', the rotor vanes 5, and into casing 22. This results in rotation of turbine rotor 4, and this rotation is transmitted to compressor impellers or rotors 6 and 7 through shaft 1.

The air for the supercharger enters through filter 52, as indicated by arrow B, and flows through intake 44 into intake section 38. This air passes through blades or vanes 7' of rotor 7 and then between blades or vanes 6' of rotor 6. From blades or vanes 6', the air flows through guide vanes 40 into outer compressor casing 31, from which it is delivered to the intake of an internal combustion engine, for example.

Lubricant is supplied through feed pipe 15 into passage 14 and into the bearings 12 and 13 through passages 14'. The lubricant is discharged through discharge nozzle 16, as indicated by the arrows C. Although the sealing air is delivered as illustrated by the arrows, there are two air flow circuits and two types of air flow. One air flow has a high pressure equal to the inner pressure of outer casing 31, and is delivered through high pressure air intake pipe 43 to air pipe 30 and then to labyrinth packings 28 and 29 of turbine rotor 4. The other air flow is at an intermediate pressure prevailing at the outlet of impeller or rotor 6, and is delivered to labyrinth packings 17 and 18 of rotor shaft 1 through apertures 37 in divider plate 35 and through apertures in impeller 6 or through air supply passage 19. The air supply to labyrinth packings 28 and 29 of turbine rotor 4 is discharged through the interior of intermediate frame 26 and thus to atmosphere. The air supply to labyrinth packings 17 and 18 of rotor shaft 1 is discharged through exhaust passage 20 and pipe 21 to atmosphere.

As stated, the invention arrangement provides for ready inspection, maintenance and repair of the bearings without disassembly of either of the casings, the bearing stand, or shaft 1. In order to remove the two half bearings 12 and 13, a wrench is inserted through one of the flow openings 61, 62, or 65 of frame 26 to remove bolts 59, 60 securing cover 9' to stand 9. Cover 9' can be easily removed since opening 61 is large enough to permit passage of cover 9' therethrough. Thereafter, bearings 12 and 13 can be inspected or replaced without displacing rotor shaft 1. Thus, rotor shaft 1 can possess a diameter, of its portion between the bearings 12 and 13, substantially larger than the diameter of bearings 12 and 13, which contributes to stable high speed operation of the supercharger.

An attendant advantage is that, since bearings 12 and 13 can be made much smaller in diameter as compared to the bearings used in conventional exhaust gas turbine superchargers, the heat developed at the bearing section can be substantially reduced. As intermediate frame 26 is formed with the air flow openings 61 through 65, the air ventilation within the intermediate frame 26 is greatly improved, so that an excessive temperature rise of bearing stand 9 and bearing cover 9' can be avoided. It should be noted that intermediate frame 26 is constructed separately from bearing stand 9, and is out of contact with bearing stand 9 at the turbine end of the latter. Consequently, heat from the turbine is transmitted to intermediate frame 26 and is not transmitted directly to bearing stand 9 despite the high temperature in exhaust gas supply pipe 23. This further contributes to substantial reduction in the temperature rise of the bearings, and can prevent excessive temperature rise therein.

Figure 4:
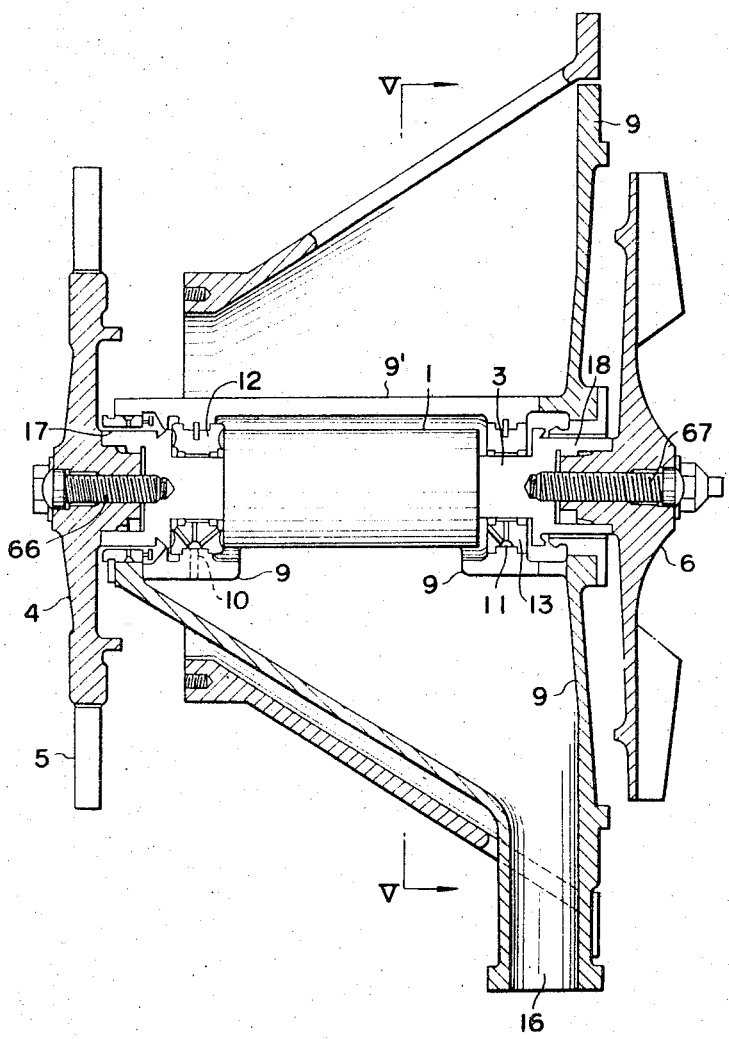
FIG. 4 is a longitudinal or axial sectional view of another form of exhaust gas turbine supercharger embodying the invention.
Figure 5:
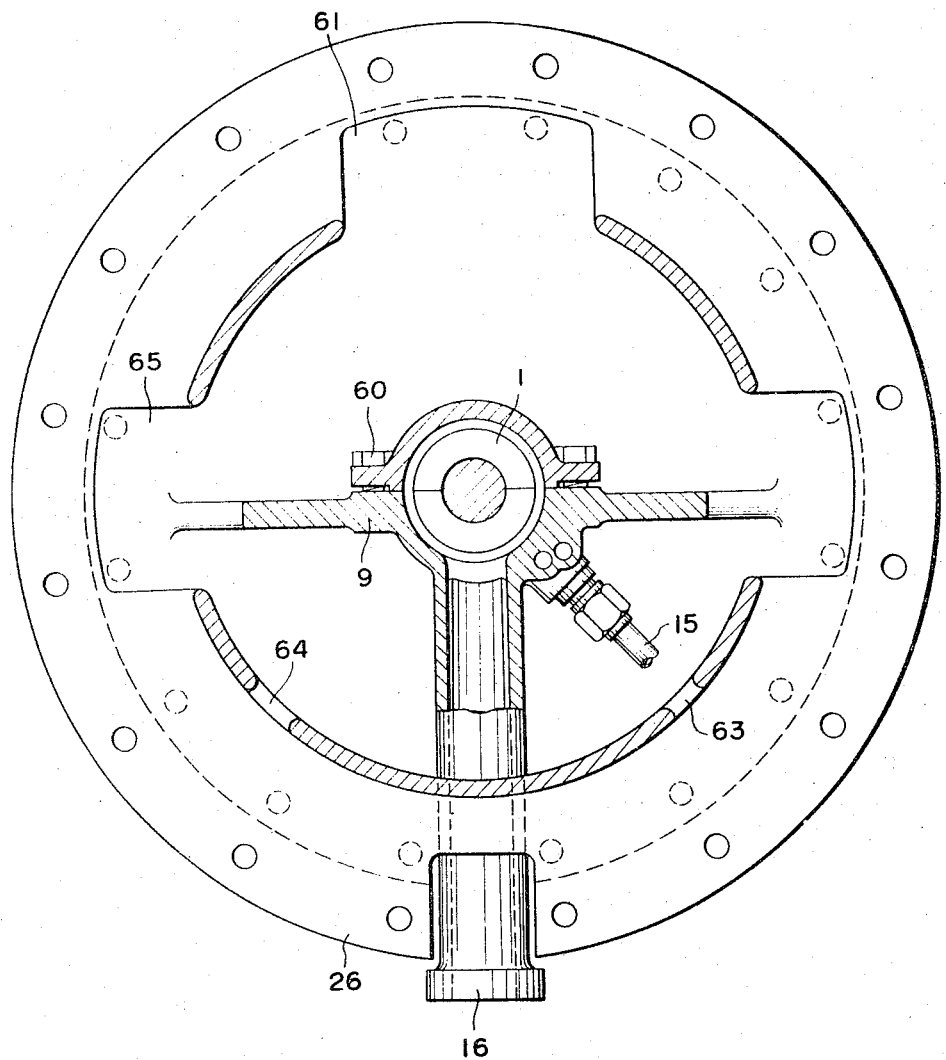
FIG. 5 is a sectional view of the supercharger shown in FIG. 4, taken on the line V—V of FIG. 4.
Figure 6:
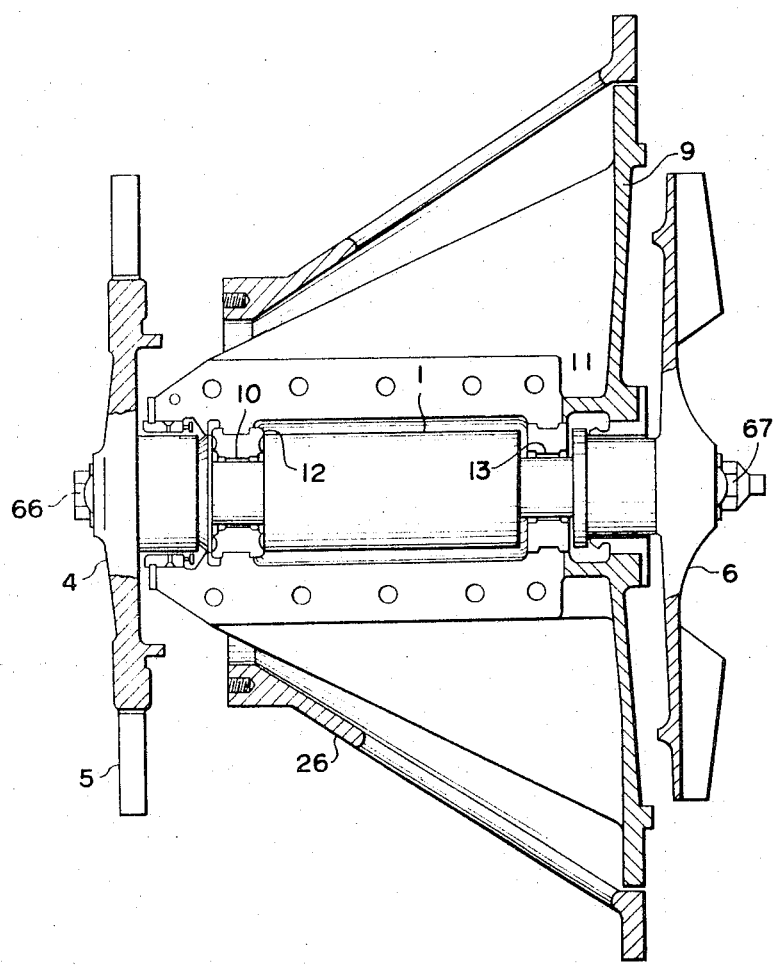
FIG. 6, is a side elevation view, partly in section, of the supercharger shown in FIGS. 4 and 5.

In the embodiment of the invention shown in FIGS. 4, 5 and 6, all of the parts are the same as in the embodiment shown in FIGS. 1, 2 and 3, except for certain changes described hereinafter, and hence the same reference numerals have been used to designate the same parts. In the embodiment of the invention shown in FIGS. 4, 5 and 6, turbine disk 4 is secured to one end of rotor shaft 1 by means of a bolt 66, and impeller or rotor 6 of the compressor is secured to the opposite end of rotor shaft 1 by a bolt 67. The operation of the supercharger is the same as described for the embodiment of the invention shown in FIGS. 1, 2 and 3. Also, inspection, replacement and repair of the half bearings 12 and 13 are effected in the same manner as with the supercharger shown in FIGS. 1, 2 and 3.

Since bearings 12 and 13 can be replaced without removing rotor shaft 1, the diameter of rotor shaft 1, axially outwardly of bearings 12 and 13 towards rotors 4 and 6, respectively, can be substantially larger than the diameter of the bearing portions 2 and 3. Thus, not only does the intermediate portion of shaft 1 have a diameter very substantially larger than that of the bearing portions, but also the end portions of the shaft have a very substantially increased diameter. As a result, turbine rotor 4 can be secured to shaft 1 by bolt 66 threaded into a tapped hole drilled at the turbine end of rotor shaft 1, and impeller or rotor 6 can be secured to shaft 1 by a bolt 67 threaded into a tapped hole in the compressor end of the rotor shaft. This enables rotor 4 and shaft 1 to be formed independently of each other, greatly simplifying the construction of these parts. Even though rotor 6 is fixedly secured to shaft 1, all parts are easily disengageable for removal, inspection or repair. Furthermore, and due to the relatively large diameter of the intermediate and the two end portions of shaft 1, stable operation at high speed is obtained.

Summarizing, the invention has the advantage of connecting both the turbine casing and the compressor casing by an intermediate frame formed with openings therein. The compressor casing and the bearing stand are interconnected with the bearing stand, which latter supports the rotor shaft by two axially spaced half bearings or two-part bearings which are enclosed in the bearing cover 9'. The two two-part bearings are thus provided in such a manner that inspection and repair can be effected through the openings in the intermediate frame without removing the intermediate frame. The bearings may be readily removed, either radially or circumferentially, relative to rotor shaft 1, so that the rotor shaft may have a large diameter at its ends as well as in its intermediate portion between the bearings. Furthermore, in the embodiments of FIGS. 4, 5 and 6, the turbine and compressor rotors are disengageably secured to opposite ends of the rotor shaft, and thus they may be easily removed therefrom as well as being firmly secured thereto.

An advantage is that the bearing stand is constructed in such a manner that it does not contact the intermediate frame and the turbine casing. This avoids heat transmission from the turbine casing or the exhaust gas supply pipe to the bearing stand. Since the intermediate frame is provided with through air flow openings, adequate cooling is obtained so that there is no necessity for forced cooling, such as by the use of water or oil. Thus, there is substantially no strain resulting from uneven thermal stresses. As the intermediate frame has a circular cross section, the frame being either conical or cylindrical, distortion due to thermal expansion is substantially eliminated.

While specific embodiments of the invention have been shown and described in detail to illustrate the principles of the invention, it will be understood that the invention may be embodied otherwise without departing from such principles.

What is claimed is:

1. An exhaust gas turbine supercharger comprising, in combination, a turbine casing; a compressor casing; a bearing stand intermediate said casings and having at least one upwardly facing substantially semicylindrical bearing support section; bearing stand being secured at one end to one end of said compressor casing and said support sections extending, in cantilever fashion, from said one end of said bearing stand; a first semicylindrical bearing supported in said support section; a substantially semicylindrical bearing stand cover complementary to said support section and disengageably secured to said stand; a second semicylindrical bearing nested in said cover and complementary to said first semicylindrical bearing to form a complete bearing; a shaft rotatably supported in said bearing and extending into each of said casings; a turbine rotor secured to said shaft within said turbine casing; a compressor rotor secured to said shaft within said compressor casing; and an intermediate frame interconnecting said casings and formed with access openings providing access to said cover and said bearing for removal, replacement and repair thereof without removal of said intermediate frame.

2. An exhaust gas turbine supercharger comprising, in combination, a turbine casing; a compressor casing; a bearing stand having a pair of spaced upwardly facing semicylindrical bearing support sections; said bearing stand being secured at one end to one end of said compressor casing and said support sections extending in cantilever fashion, from said one end of said bearing stand; a pair of first semicylindrical half bearings each supported in a respective support section; a bearing stand cover having substantially semicylindrical portions complementary to said support sections, and disengageably secured to said stand; a pair of spaced second semicylindrical half bearings nested in said cover and each complementary to a respective first half bearing to form a complete bearing; a shaft rotatably supported in said bearings and extending int oeach of said casings; a turbine rotor secured to said shaft within said turbine casing; a compressor rotor secured to said shaft within said compressor casing; and an intermediate frame interconnecting said casings and formed with access openings providing access to said cover and said bearings for removal, replacement and repair thereof without removal of said intermediate frame.

3. An exhaust gas turbine supercharger comprising, in combination, a turbine casing; a compressor casing; a bearing stand having a pair of spaced upwardly facing semicylindrical bearing support sections; a pair of first semicylindrical half bearings each supported in a respective support section; a bearing stand cover having substantially semicylindrical portions complementary to said support sections, and disengageably secured to said stand;

a pair of spaced second semicylindrical half bearings nested in said cover and each complementary to a respective first half bearing to form a complete bearing; a shaft rotatably supported in said bearings and extending into each of said casings; a turbine rotor secured to said shaft within said turbine casing; a compressor rotor secured to said shaft within said compressor casing; and an intermediate frame interconnecting said casings and formed with access openings providing access to said cover and said bearings for removal, replacement and repair thereof without removal of said intermediate frame; said shaft having relatively small diameter bearing portions engaging said bearings and being of relatively large diameter except for said bearing portions, contributing to stable rotation of said shaft at high speeds.

4. An exhaust gas turbine supercharger comprising, in combination, a turbine casing; a compressor casing; a bearing stand having a pair of spaced upwardly facing semicylindrical bearing support sections; a pair of first semicylindrical half bearings each supported in a respective support section; a bearing stand cover having substantially semicylindrical portions complementary to said support sections, and disengageably secured to said stand; a pair of spaced second semicylindrical half bearings nested in said cover and each complementary to a respective first half bearing to form a complete bearing; a shaft rotatably supported in said bearings and extending into each of said casings; a turbine rotor secured to said shaft within said turbine casing; a compressor rotor secured to said shaft within said compressor casing; and an intermediate frame interconnecting said casing and formed with access openings providing access to said cover and said bearings for removal, replacement and repair thereof without removal of said intermediate frame; said shaft having relatively small diameter bearing portions engaging said bearings; said shaft, intermediate said bearing portions, being of relatively large diameter, contributing to stable rotation of said shaft at relatively high speeds.

5. An exhaust gas turbine supercharger comprising, in combination, a turbine casing; a compressor casing; a bearing stand having a pair of spaced upwardly facing semicylindrical bearing support sections; a pair of first semicylindrical half bearings each supported in a respective support section; a bearing stand cover having substantially semicylindrical portions complementary to said support sections, and disengageably secured to said stand; a pair of spaced second semicylindrical half bearings nested in said cover and each complementary to a respective first half bearing to form a complete bearing; a shaft rotatably supported in said bearing and extending into each of said casings; a turbine rotor secured to said shaft within said turbine casing; a compressor rotor secured to said shaft within said compressor casing; and an intermediate frame interconnecting said casings and formed with access openings providing access to said cover and said bearings for removal, replacement and repair thereof without removal of said intermediate frame; said shaft having a pair of relatively small diameter bearing portions engaging said bearings; said shaft, intermediate said bearing portions and axially outwardly thereof, being of relatively large diameter, thereby contributing to stable rotation of said shaft at relatively high speeds.

6. An exhaust gas turbine supercharger comprising, in combination, a turbine casing; a compressor casing; a bearing stand having a pair of spaced upwardly facing semicylindrical bearing support sections; a pair of first semicylindrical half bearings each supported in a respective support section; a bearing stand cover having substantially semicylindrical portions complementary to said support sections, and disengageably secured to said stand; a pair of spaced second semicylindrical half bearings nested in said cover and each complementary to a respective first half bearing to form a complete bearing; a shaft rotatably supported in said bearings and extending into each of said casings; a turbine rotor secured to said shaft within said turbine casing; a compressor rotor secured to said shaft within said compressor casing; and an intermediate frame interconnecting said casings and formed with access openings providing access to said cover and said bearings for removal, replacement and repair thereof without removal of said intermediate frame; said bearing stand being mechanically connected to said compressor casing at one end, and extending, in cantilever fashion, from said one end and having its opposite end in physically spaced relation to said turbine casing.

7. An exhaust gas turbine supercharger comprising, in combination, a turbine casing; a compressor casing; a bearing stand having a pair of spaced upwardly facing semicylindrical bearing support sections; said bearing stand being secured at one end to one end of said compressor casing and said support sections extending, in cantilever fashion, from said one end of said bearing stand; a pair of first semicylindrical half bearings each supported in a respective support section; a bearing stand cover having substantially semicylindrical portions complementary to said support sections, and disengageably secured to said stand; a pair of spaced second semicylindrical half bearings nested in said cover and each complementary to a respective first half bearing to form a complete bearing; a shaft rotatably supported in said bearings and extending into each of said casings; a turbine rotor secured to said shaft within said turbine casing; a compressor rotor secured to said shaft within said compressor casing; and an intermediate frame interconnecting said casings and formed with access openings providing access to said cover and said bearings for removal, replacement and repair thereof without removal of said intermediate frame; said intermediate frame surrounding said bearing stand and cover in laterally spaced relation thereto, and said access openings providing for air circulation within and through said intermediate frame for cooling of said bearing stand and cover.

8. An exhaust gas turbine supercharger comprising in combination, a turbine casing; a compressor casing; a bearing stand having a pair of spaced upwardly facing semicylindrical bearing support sections; said bearing stand being secured at one end to one end of said compressor casing and said support sections extending, in cantilever fashion, from said one end of said bearing stand; a pair of first semicylindrical half bearings each supported in a respective support section; a bearing stand cover having substantially semicylindrical portions complementary to said support sections, and disengageably secured to said stand; a pair of spaced second semicylindrical half bearings nested in said cover and each complementary to a respective first half bearing to form a complete bearing; a shaft rotatably supported in said bearings and extending into each of said casings; a turbine rotor secured to said shaft within said turbine casing; a compressor rotor secured to said shaft within said compressor casing; and an intermediate frame interconnecting said casings and formed with access openings providing access to said cover and said bearings for removal, replacement and repair thereof without removal of said intermediate frame; said turbine rotor being integral with one end of said shaft.

9. An exhaust gas turbine supercharger comprising, in combination, a turbine casing; a compressor casing; a bearing stand having a pair of spaced upwardly facing semicylindrical bearing support sections; said bearing stand being secured at one end to one end of said compressor casing and said support sections extending, in cantilever fashion, from said one end of said bearing stand; a pair of first semicylindrical half bearings each supported in a respective support section; a bearing stand cover having substantially semicylindrical portions complementary to said support sections, and disengageably secured to said stand; a pair of spaced second semicylindrical half bearings nested in said cover and each complementary to a respective first half bearing to form a complete bearing; a shaft rotatably supported in said bearings and extending into each of said casings; a turbine rotor secured to said shaft within said turbine casing; a compressor rotor secured to said shaft within said compressor casing; and an intermediate frame interconnecting said casings and formed with access openings providing access to said cover and said bearings for removal, replacement and repair thereof without removal of said intermediate frame; said rotors being disengageable from said shaft.

10. An exhaust gas turbine supercharger comprising, in combination, a turbine casing; a compressor casing; a bearing stand having a pair of spaced upwardly facing semicylindrical bearing support sections; a pair of first semicylindrical half bearings each supported in a respective support section; a bearing stand cover having substantially semicylindrical portions complementary to said support sections, and disengageably secured to said stand; a pair of spaced second semicylindrical half bearings nested in said cover and each complementary to a respective first half bearing to form a complete bearing; a shaft rotatably supported in said bearings and extending into each of said casings; a turbine rotor secured to said shaft within said turbine casing; a compressor rotor secured to said shaft within said compressor casing; an intermediate frame interconnecting said casings and formed with access openings providing access to said cover and said bearings for removal, replacement and repair thereof without removal of said intermediate frame; and means for supplying lubricant under pressure to said bearings, and including a lubricant supply line extending through one of said access openings, and a lubricant drain line extending through one of said access openings.

11. An exhaust gas turbine supercharger comprising, in combination, a turbine casing; a compressor casing; a bearing stand having a pair of spaced upwardly facing semicylindrical bearing support sections; a pair of first semicylindrical half bearings each supported in a respective support section; a bearing stand cover having substantially semicylindrical portions complementary to said support sections, and disengageably secured to said stand; a pair of spaced second semicylindrical half bearings nested in said cover and each complementary to a respective first half bearing to form a complete bearing; a shaft rotatably supported in said bearings and extending into each of said casings; a turbine rotor secured to said shaft within said turbine casing; a compressor rotor secured to said shaft within said compressor casing; an intermediate frame interconnecting said casings and formed with access openings providing access to said cover and said bearings for removal, replacement and repair thereof without removal of said intermediate frame; labyrinth packings disposed between said stand and said shaft outwardly of said bearings; and means for supplying air under pressure from the compressor to said labyrinth packings.

12. An exhaust gas turbine supercharger comprising, in combination, a turbine casing; a compressor casing; a bearing stand having a pair of spaced upwardly facing semicylindrical bearing support sections; a pair of first semicylindrical half bearings each supported in a respective support section; a bearing stand cover having substantially semicylindrical portions complementary to said support sections, and disengageably secured to said stand; a pair of spaced second semicylindrical half bearings nested in said cover and each complementary to a respective first half bearing to form a complete bearing; a shaft rotatably supported in said bearings and extending into each of said casings; a turbine rotor secured to said shaft within said turbine casing; a compressor rotor secured to said shaft within said compressor casing; an intermediate frame interconnecting said casings and formed with access openings providing access to said cover and said bearings for removal, replacement and repair thereof without removal of said intermediate frame; labyrinth packings disposed between said turbine rotor and said shaft; and means for supplying air under pressure from the compressor to said labyrinth packings.

13. An exhaust gas turbine supercharger comprising, in combination, a turbine casing; a compressor casing; a bearing stand having a pair of spaced upwardly facing semicylindrical bearing support sections; a pair of first semicylindrical half bearings each supported in a respective support section; a bearing stand cover having substantially semicylindrical portions complementary to said support sections, and disengageably secured to said stand; a pair of spaced second semicylindrical half bearings nested in said cover and each complementary to a respective first half bearing to form a complete bearing; a shaft rotatably supported in said bearings and extending into each of said casings; a turbine rotor secured to said shaft within said turbine casing; a compressor rotor secured to said shaft within said compressor casing; an intermediate frame interconnecting said casings and formed with access openings providing access to said cover and said bearings for removal, replacement and repair thereof without removal of said intermediate frame; first labyrinth packings disposed between said turbine rotor and said shaft; second labyrinth packings disposed between said shaft and said stand outwardly of said bearings; means for supplying air from the compressor at a relatively high pressure to said first labyrinth packings; and means for supplying air from the compressor at an intermediate pressure to said second labyrinth packings.

14. An exhaust gas turbine supercharger comprising, in combination, a turbine casing; a compressor casing; a bearing stand having a pair of spaced upwardly facing semicylindrical bearing support sections; a pair of first semicylindrical half bearings each supported in a respective support section; a bearing stand cover having substantially semicylindrical portions complementary to said support sections, and disengageably secured to said stand; a pair of spaced second semicylindrical half bearings nested in said cover and each complementary to a respective first half bearing to form a complete bearing; a shaft rotatably supported in said bearings and extending into each of said casings; a turbine rotor secured to said shaft within said turbine casing; a compressor rotor secured to said shaft within said compressor casing; an intermediate frame interconnecting said casings and formed with access openings providing access to said cover and said bearings for removal, replacement and repair thereof without removal of said intermediate frame; first labyrinth packings disposed between said turbine rotor and said shaft; second labyrinth packings disposed between said shaft and said stand outwardly of said bearings; means for supplying air from the compressor at a relatively high pressure to said first labyrinth packings; and means for supplying air from the compressor at an intermediate pressure to said second labyrinth packings; said means for supplying air at relatively high pressure to said first labyrinth packings extending through one of said access openings.

15. An exhaust gas turbine supercharger comprising, in combination, a turbine casing; a compressor casing spaced from said turbine casing; a bearing stand having a pair of spaced upwardly facing semicylindrical bearing support sections, one adjacent each of said casings; a pair of first semicylindrical half bearings each supported in a respective support section; a bearing stand cover having substantially semicylindrical sections complementary to said support sections, and disengageably secured to said stand; a pair of spaced second semicylindrical half bearings nested in said cover and each complementary to a respective first half-bearing to form a complete bearing; a shaft having relatively small diameter bearing support sections engaged in each of said bearings, said shaft extending into each of said casings; said shaft having a relatively large diameter intermediate section between said bearing support sections, and having relatively large outer diameter end sections outwardly of said bearing portions; each of said end sections being formed with a cylindrical recess therein coaxial with said shaft, and having a tapped bore extending axially inwardly therefrom; a turbine rotor having a substantially cylindrical hub portion positioned in one of said cylindrical recesses; a bolt extending through said turbine rotor and into the associated tapped bore to disengageably secure said turbine rotor to one end of said shaft; a compressor rotor having a cylindrical hub portion nested in the other of said cylindrical recesses; a bolt extending through said compressor rotor and threaded into the associated tapped bore to disengageably secure said compressor rotor to the opposite end of said shaft; and an intermediate frame connecting said casings and formed with access openings providing access to said cover and said half bearings for removal, replacement and repair thereof without removal of said intermediate frame.

References Cited by the Examiner
UNITED STATES PATENTS

| | | | |
|---|---|---|---|
| 544,758 | 8/1895 | Davidson | 230—116 X |
| 855,809 | 6/1907 | Rateau | 230—116 |
| 2,400,711 | 5/1946 | Ponomareff et al. | 230—116 X |

ROBERT M. WALKER, *Primary Examiner.*